2 Sheets—Sheet 1.
M. L. HULL.
VAPOR STOVE.
No. 10,849. Reissued July 12, 1887.
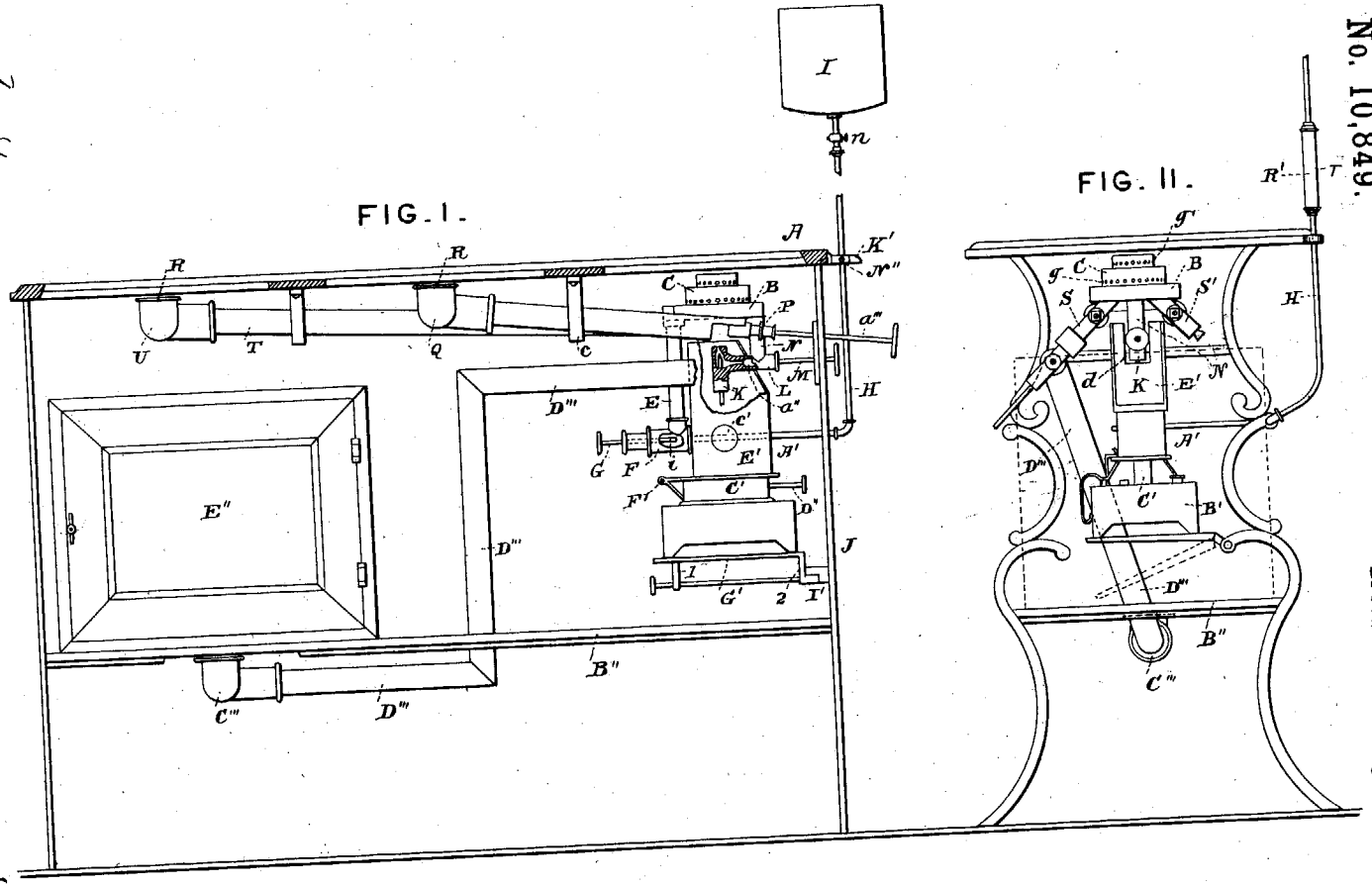
Attest.
Geo. T. Smallwood,
F. A. Hawkins.
Inventor:
M. L. Hull,
By Wright Bros attys.
N. PETERS, Photo-Lithographer, Washington, D. C.

M. L. HULL.
VAPOR STOVE.
No. 10,849. Reissued July 12, 1887.
FIG. III.
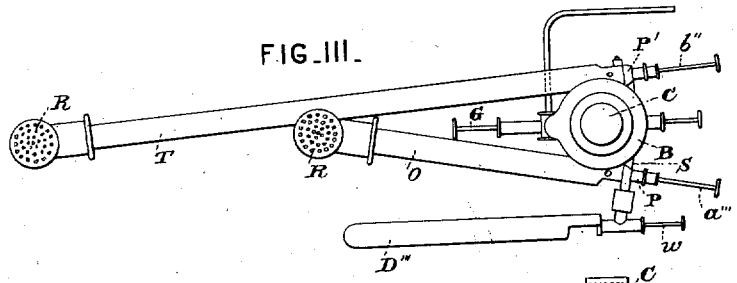
FIG. IV.
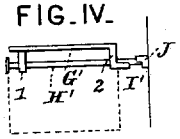
FIG. V.
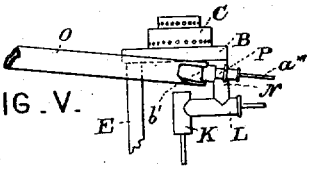
FIG. VIII.
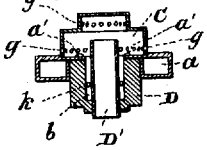
FIG. VII.
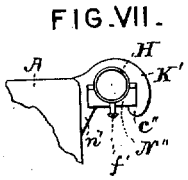
FIG. VI.
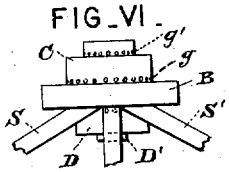
FIG. IX.
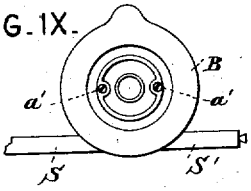
FIG. X.
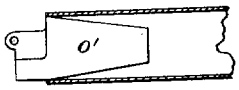
FIG. XI.
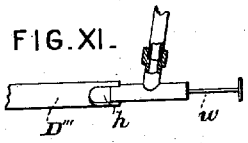
Attest.
Geo. T. Smallwood.
F. A. Hopkins.
Inventor;
M. L. Hull.
By Knight Bros
Attys
N. PETERS, Photo-Lithographer, Washington, D. C.

UNITED STATES PATENT OFFICE.

MARTIN L. HULL, OF CLEVELAND, OHIO.

VAPOR-STOVE.

SPECIFICATION forming part of Reissued Letters Patent No. 10,849, dated July 12, 1887.

Original No. 343,127, dated June 1, 1886. Application for reissue filed April 30, 1887. Serial No. 236,706.

*To all whom it may concern:*

Be it known that I, MARTIN L. HULL, of Cleveland, in the county of Cuyahoga and State of Ohio, have invented a certain new and Improved Vapor-Stove; and I do hereby declare that the following is a full and complete description thereof.

The special purpose of the stove above referred to is for burning ordinary petroleum-oil vaporized for that purpose by the peculiar construction of the stove described and set forth in the following specification, and shown in the accompanying drawings, making a part of the same, in which—

Figure I represents a side view of the improved stove, the top of which is partly removed that the mechanism under it may be seen. Fig. II shows an end view of the stove, one of the legs being removed that the working parts may be fully seen. The rest of the figures (nine in number) are detached sections, to which reference will be made.

Like letters of reference denote like parts in the views presented.

The frame is or may be like the frame of an ordinary gasoline-stove, and provided with pot-holders and grates in the same way.

B, Figs. I and VI, is the vapor-generator, having an annular chamber, *a*, Fig. VIII. On the top of the generator B (but having no direct communication therewith) is placed a commingling-chamber, C. Within the generator B is secured by the screws *a'*, Figs. VIII and IX, an auxiliary commingling tube or chamber, D, through which and through the central opening in the generator B passes a commingling induction vapor-tube, D', which is much smaller in diameter than the central opening in the generator B, thereby causing an annular space, *b*, round the commingling-tube, as seen in Figs. VIII and IX, thereby putting the commingling-chamber C and the auxiliary commingling-chamber D in communication one with the other, forming one continuous united chamber extending from above to the under side of the generator, as shown in the drawings.

It will be observed in Figs. VI and VIII that the lower series of perforations in the commingling-chamber C are in close proximity to the upper surface of the generator, and that the perforations in the auxiliary commingling-chamber are in close proximity to the under side of the generator, and that the commingling-tube D' extends to and terminates in the chamber C, as shown in Fig. VIII. Further attention will be called to this part of the stove hereinafter.

E, Figs. I, III, and IX, is an oil-supply pipe opening into the generator, the lower end of the pipe terminating in a valve-casing, F, in which is a plug-valve, *i*, similar to the valve *h* in Fig. II, and of which G is the stem for operating it. By means of a pipe, H, the supply-pipe and the valve-casing F are put in communication with an oil-can, I, for supplying the generator with oil. Immediately below the generator, and in alignment with the commingling-tube D', Fig. VIII, is a vapor-tube, K, having within it a needle-valve and stem, Figs. I and V. The upper end of the tube K is contracted to a small jet-orifice. In the arm L of said tube K is a plug-valve, *a''*, Fig. I, similar to the valve *h* in Fig. II, and of which M is the stem.

The arm L, above mentioned, is put in communication with the generator by a tube, N, a continuation of the tubular arm L, as seen in Figs. I, II, and VI, and thereby vapor is conveyed from the generator to the vapor-tube K, from which on opening the valve *a''* it escapes into the commingling-tube D', through which it passes into the commingling-chamber C, and down the annular space *b* into the auxiliary commingling-chamber under the generator, and is then burned, as hereinafter manifest.

The commingling-chamber C in its communication with the generator forms a burner, and is supplied with vapor from said generator. On one side of said burner is a pipe, O. Practically the pipe is of large size. About one inch and a quarter in diameter (more or less) is found by experience to be necessary for a successful working of the stove. Said pipe O is arranged in alignment with the needle-valve *b'* in the casing P, and of which *a''''*, Fig. I, is the stem for manipulating it. The end of the pipe O is open and in close proximity to the needle-valve *b'*.

It will be noticed in the drawings that a portion of the diameter of said pipe is cut away, and that the portion left projects over onto the valve-casing P, to which it is made fast for securing that end of the pipe in place, and also to form a hood or covering for the needle-valve to protect the vapor issuing therefrom from becoming ignited by the flame-jets issuing from the auxiliary commingling-chamber, hereinafter further noticed. By this portion which is left being subjected to the flames from the jets in the auxiliary commingling-chamber the pipe O is so heated that the volatile fluids are kept from condensing, especially when the heavier oils are used for fuel. The opposite end of the pipe O is suspended from the under side of the top of the stove by a hanger, *c*, and extends to a pot-holder or grate, and there terminates in a vapor-burner consisting of a cup, Q, provided with a wide face covered by a finely-perforated plate or disk, R, which is made of saw-blade steel having a flat surface, and its flange made plain and to fit snugly over the cup Q, Figs. I and III, which forms the subject-matter of another claim in a pending application filed by me November 3, 1884. The needle-valve casing P, above alluded to, is put in communication with the generator by a tube, S, Figs. II and III, also shown in Figs. VI and IX, by which the said burner Q is supplied with vapor. On the opposite side of the generator is arranged in like manner a similar pipe, T, which is also secured by a hanger to the top of the stove, and the end thereof extends back to another pot-holder or grate, and there terminates in a vapor-burner, U, a duplicate of the burner Q above described. Said pipe T is in alignment with a needle-valve in the valve-casing P′. The valve and casing are duplicates of the valve *b*′ and casing P, above described, and of which *b*″ is the stem for operating it. The casing P′ and valve are put in communication with the generator by a tube, S′, a duplicate of the tube S on the opposite side of the generator.

A′ is an oil-lamp differing from ordinary oil-lamps mainly in being so constructed as to adapt it to be used in connection with the stove, for a purpose presently shown. Briefly, the lamp consists of the oil-fount B′, wick-tube C′, and the rolier D″, Fig. I, for raising and lowering the wick.

E′ is the chimney, hinged at F′ to the oil-fount B′, that it may be turned from over the wick for access thereto. Said chimney is of metal, and has in one side a slot, *d*, adapted to receive the tubular arm L when the lamp is placed in position for practical use, as shown in Figs. I and II. In the side of the chimney is an opening, *e*′, covered with mica, for observing the interior of the lamp.

It will be noticed that the lamp stands on a shelf, G′, and that the shelf is provided with a pair of ears, 1 and 2, through which passes a rod, H′, whereon the ears are free to slide and turn. The shelf is supported in a horizontal position by a clutch, I′, Figs. I and IV. Section J of the clutch is fixed to the rod, whereas the ear 2 (the corresponding section of the clutch) is free to slide and turn on the rod. Each section of the clutch is a semicircular lug projecting along the rod toward the other, as shown in Fig. IV. The two sections of the clutch when brought together lap onto each other, as seen in Fig. I, thereby locking the shelf in a horizontal position, as seen in Fig. II. The sections of the clutch when separated by sliding the shelf along on the rod, as seen in Fig. IV, allow the shelf to turn downward, as indicated by the dotted line *r* in Fig. IV, for the purpose of removing the lamp from the shelf, or for placing it thereon, as the case may be.

The oil-supply can I is detachably connected to the pipe H by a coupling, *n*, Fig. I. Below the above-said coupling is a filter consisting of a cylindrical shell, R′, Fig. II, filled with cotton, or with any other suitable material, connecting with the pipe H, which is held in a vertical position by a book, K′, Fig. VII, on the corner of the top of the stove-frame A. The hook is adapted to fit partly round the pipe. On the inner side of the hook is a recess forming a shoulder, *c*″. Across from said shoulder is a corresponding shoulder, *n*′. Between the two shoulders and the pipe is inserted a key-block, N″, which may be slightly tapering, that it may wedge in between the shoulders to prevent its falling out. The block is provided with a groove adapted to fit the side of the pipe, as seen in Fig. VII.

*f*′ is a set-screw passing through the block to the pipe, against which it is forced, thereby binding the pipe fast in the hook, as seen in the drawings.

As hereinbefore mentioned, the above-described stove is intended mainly for burning heavy hydrocarbon oil, which requires more heat and time to vaporize it than the lighter product of petroleum, (gasoline.) Therefore when the heavy oil is used a lamp is necessary for starting the burner by heating up the generator, which when fully heated will vaporize the oil rapidly and in sufficient quantity to supply the burners with vapor without a continued use of the lamp.

For the above-specified purpose oil from the can I is conducted by the pipe H down to the pipe E and valve *i*, which on being opened permits oil to pass therefrom to the generator. The lamp is now or it may be previously placed in position under the generator, as shown in Figs. I and II, and lighted, the heat from which, being applied directly under the generator, and also enveloping the tubular arm L and its appendages, soon vaporizes the oil in the generator. The vapor passes from the generator through the tube N to the arm or valve-casing L. The valve *a*″ being opened, the vapor flows therefrom through the tube K into the commingling induction-tube D′, Figs.

II, VI, and VIII, thence upward into the commingling-chamber C, and issues therefrom through the perforations *g* and *g'*, and burns in fine jets of blue flame. At the same time the vapor passes down around the commingling-tube D' to the auxiliary commingling-chamber *b* below the generator, and issues therefrom through the perforations *k*, Fig. VI, in blue jets of flame.

It will be noticed that the perforations *g* in the commingling chamber or cap C are close to the surface of the generator, so that the ignited jets of vapor issuing therefrom impinge upon and sweep over its broad upper surface; also, the perforations in the auxiliary chamber *b* being close to the under side of the generator, the flame-jets issuing therefrom sweep over and in contact with the under side of the generator. The two jets of flame impinging upon the upper and lower sides of the generator from the commingling-chambers C and D, respectively, and the two chambers being in open relation one with the other, (forming a continuous combustion-chamber,) a powerful heat is produced, which completely vaporizes the heavy oil for supplying the burners without further aid of the lamp, which may now be removed or extinguished, it being only used for the initial vaporizing of the oil, as above said.

A portion of the vapor, generated as above described, is conveyed from the generator to the burner Q through the pipe O on opening the valve *b'*. The vapor as it issues from the foraminous surface of the burner burns in numerous fine jets, which commingle and form a compact body of flame, but which cannot burn back in the head of the burner by virtue of the well-known principle of Davy's safety-lamp. Substantially in the same way vapor is conveyed from the generator to the burner U through the pipe T on opening its valve in the casing P', and so on to other burners that may be used in connection with the stove, and which may be more or less in number.

To increase the working capacity of the stove without extending and enlarging the same, a pot-holder or grate is made in the catch-pan B'', and provided with a vapor-burner, C''', similar to the burner U. The burner C''' is put in communication with the generator by a pipe, D''', connected to the pipes S or S', which for that purpose are extended so far as to make the connection and provide a casing for a stop valve, *h*, of which *w* is the stem, whereby the valve is operated for regulating the flow of vapor to the burner, in connection with which may be used an oven, E'', or other article of culinary use.

In the drawings the generator is shown as located at one end of the stove-frame and the burners on one side of the generator, excepting the initial one in connection with the generator.

Although the above-described stove is intended for burning heavy coal-oil, a lighter oil may be used, if so required; but in that case the auxiliary heating-chamber is used without having as many perforations as in the case where the heavy oils are used. The generator, when once started, will vaporize the light grade of oil rapidly and sufficiently to supply the burners without so many perforations in the auxiliary heating-chamber, as aforesaid.

For the purpose of preventing the vapor from rebounding on entering the large commingling-tubes, a short funnel, *o'*, may be attached to the induction end of the said tubes, through which funnels the vapor passes into said tubes, thus drawing in more air with the vapor, thereby producing better combustion than otherwise obtained. Said funnel is shown in Fig. X within the tube O.

What I claim as my invention, and desire to secure by Letters Patent, is—

1. The combination, with an annular generator having a supply-pipe leading thereto, of a cap supported thereon, having perforations close to the top of the generator, an auxiliary tube within the annular generator, extending below the same and having perforations close to the bottom of the generator, a mixing-tube within the auxiliary tube, and a pipe for conveying vapor from the generator to the mixing-tube, substantially as and for the purpose described.

2. The combination, with the frame of a vapor-stove and a vapor-generator supported by said frame, located near the end thereof and having jet-orifice pipes, of mixing-tubes unequal in length extending from said jet-orifice pipes in substantially the same direction, and burners connected to said tubes, the burner on the shorter tube being located close to the longer tube, so as to heat the vapor therein.

3. The combination, with an annular generator having an inlet-pipe for oil on one side and escape-pipes for vapor on the other, of mixing-tubes communicating with said escape-pipes, each cut away on one side to admit air, a perforated burner-cap supported on the generator and open below, an auxiliary tube extending below the same and having perforations close to the escape-pipes, and a pipe for conveying vapor from the generator, extending from the generator to the under side of the burner-cap, substantially as described.

4. In vapor-burning stoves, the combination of the stove-frame, an oven placed beneath the top of the frame, a self-generating vapor-burner, the vapor-supply pipe from the generator, and the burner under the oven, substantially as and for the purpose described.

5. In a vapor-stove, the combination of the stove-frame, a generating-burner at the top of the stove, an oven located upon the lower part of the frame, a lower non-generating burner for said oven, a tube for vapor and air extending from the upper to the lower burner, and an injecting device supplied with vapor from the generator of the upper burner for delivering mixed air and vapor to the upper end of said tube.

6. In combination with the stove-top and pipe H′, the shouldered hook K′, key-block N′, and set-screw, substantially as and for the purpose specified.

In testimony whereof I affix my signature in presence of two witnesses.

MARTIN L. HULL.

Witnesses:
T. E. EGBERT,
MAGGIE B. EGBERT.